(12) United States Patent
Campbell et al.

(10) Patent No.: US 8,739,388 B2
(45) Date of Patent: Jun. 3, 2014

(54) METHOD OF FASTENING PARTS TO A COMPOSITE PART

(75) Inventors: Aindrea McKelvey Campbell, Beverly Hills, MI (US); Daniel Quinn Houston, Dearborn, MI (US); Amanda Kay Freis, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 13/448,464

(22) Filed: Apr. 17, 2012

(65) Prior Publication Data
US 2013/0273314 A1    Oct. 17, 2013

(51) Int. Cl.
B21J 15/02    (2006.01)

(52) U.S. Cl.
USPC ............ 29/525.06; 29/525.01; 29/525.05; 29/521

(58) Field of Classification Search
USPC ........... 29/505, 514, 521, 524.1, 525, 525.01, 29/525.05, 525.06, 525.07, 798, 243.53, 29/432.2; 411/179, 180, 501
See application file for complete search history.

(56) References Cited

U.S. PATENT DOCUMENTS

| | | | |
|---|---|---|---|
| 4,327,536 A * | 5/1982 | Ascher | ........................ 52/309.12 |
| 5,359,765 A | 11/1994 | Auriol et al. | |
| 5,882,462 A | 3/1999 | Donecker et al. | |
| 7,252,469 B2 | 8/2007 | Zaluzec et al. | |
| 7,284,319 B2 | 10/2007 | Kato et al. | |
| 7,849,573 B2 | 12/2010 | Saathoff, Sr. | |
| 2009/0126180 A1 | 5/2009 | Keener | |

FOREIGN PATENT DOCUMENTS

| | | |
|---|---|---|
| CN | 101510478 A | 8/2009 |
| EP | 23359955 A2 | 8/2011 |

OTHER PUBLICATIONS

DOGMA Cluster 1: Joining Techniques, Jan. 31, 2001.
Livan Fratini et al., Self-Piercing Riveting for Aluminum Alloys-Composites Hybrid Joints, May 12, 2008.

* cited by examiner

*Primary Examiner* — David Bryant
*Assistant Examiner* — Ryan J Walters
(74) *Attorney, Agent, or Firm* — Raymond L. Coppiellie; Brooks Kushman P.C.

(57) ABSTRACT

A method of joining parts together with a self-piercing rivet that is inserted through a part and partially through a second part. The second part includes a fiber-filled layer and a resin matrix layer that together form a composite part. A self-piercing rivet extends into the second part, but does not penetrate completely through the matrix layer. An assembly, including a first part and a second part that includes a reinforced layer and a resin layer in which a fastener is inserted, but does not extend through the second layer. A composite part including a first layer of resin matrix reinforces the filler and a second layer of resin matrix that does not include a filler and is more than 3 microns thick.

5 Claims, 2 Drawing Sheets

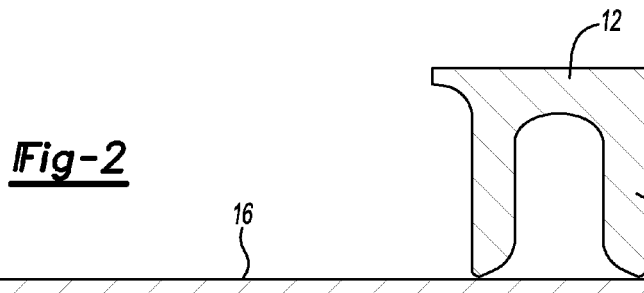
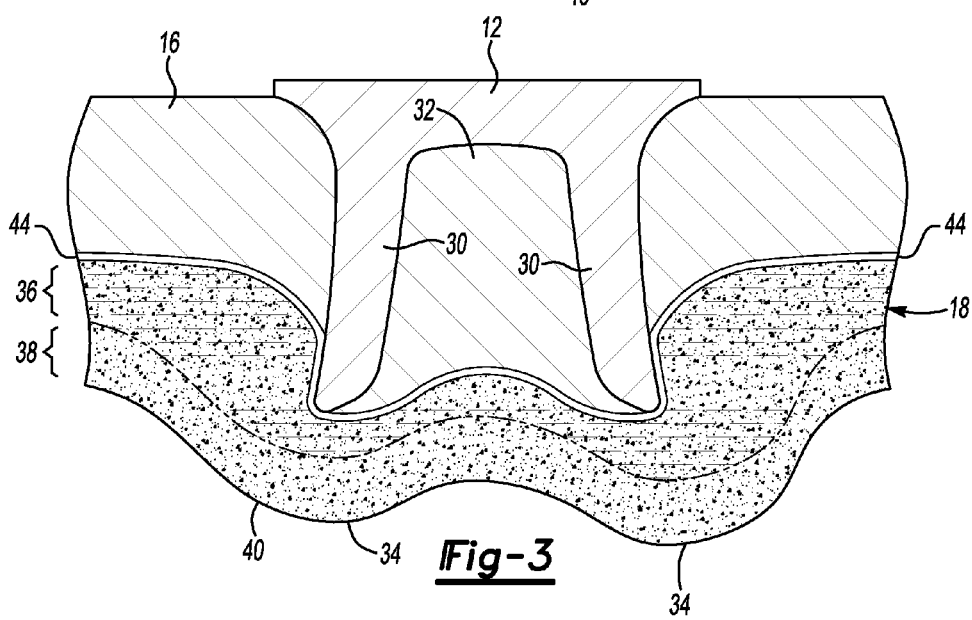
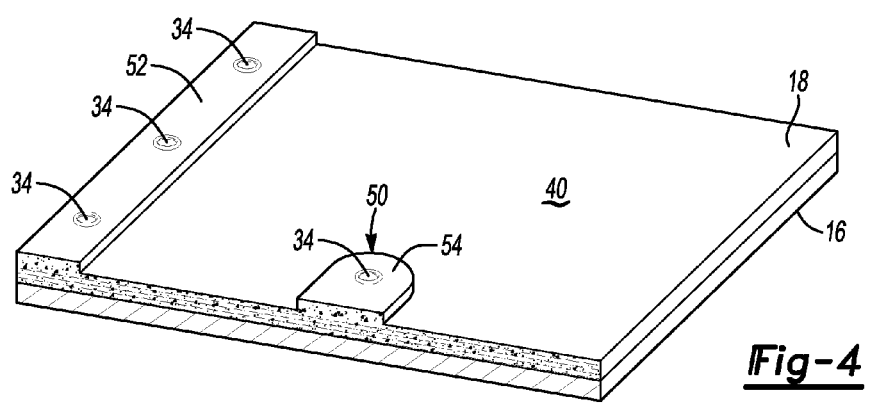

METHOD OF FASTENING PARTS TO A COMPOSITE PART

TECHNICAL FIELD

This disclosure relates to fastening parts or panels to a composite part formed from a resin and a fibrous filler material.

BACKGROUND

As the automotive industry continues to focus on reducing the weight of vehicles to meet customer expectations on fuel economy and CAFE requirements, interest in alternative materials including carbon fiber composite applications has increased. In body-in-white structures, joining methods have traditionally relied on resistance-spot welding (e.g., in steel structures). In the case of aluminum intensive vehicles and other mixed metal joining applications, self-piercing rivet (SPR) technology prevails. One advantage of SPR technology is that it is a high production volume assembly process. Further, it is compatible with adhesive, where both methods can be used in conjunction. The challenge often faced with SPR however, is that the substrate material must be ductile enough to form a "button", i.e., protrusion, which is the result of creating the joint and the necessary deformation to provide mechanical interlock. When composite parts do not have sufficient ductility to form a button on the obverse side, fibers may be exposed through cracks in this surface. Surface cracking and fiber displacement are undesirable, as they may reduce the durability of the joint and result in premature failure.

Composite materials, such as carbon fiber, glass fiber or natural fiber composites, can be limited in application due to challenges relating to joining parts together. Frequently, these composites have limited ductility and are not well adapted to large displacements and deformation required to produce an SPR button. While adhesive has been used extensively in the past to join composite parts together, adhesive joining is a lower volume production method when used in isolation and is susceptible to displacement (i.e., movement between the parts to be joined) until the glue is cured. Other methods, such as blind rivets may be used to fasten parts to a composite component but it is necessary to first drill or pre-form a hole through the parts to insert the blind rivet. Assembly operations for drilling holes, aligning the holes, inserting the blind rivet and affixing the rivet add to the cost of assembly and the cost of tooling. A joining solution is needed that meets high volume production requirements and enables joining in a low ductility material.

This disclosure is directed to overcoming the above problems and other problems associated with the use of composite parts in applications where other parts are joined to a composite part.

SUMMARY

The method may be performed with a self-piercing rivet (hereinafter "SPR"). The tool used to insert the SPR is a riveting tool that includes a punch and a die, as a back-up.

According to one aspect of this disclosure, a method of joining a part to a composite material part is disclosed. According to the method, a first part is selected and a second part is selected that includes a first layer of a resin matrix that is reinforced with a filler material and a second layer of a resin matrix that does not include the filler material on at least part of one side of the second part. The first and second parts are inserted between a fastener in a tool and a back-up. The fastener is driven through the first part, the first layer of the second part and into the second layer of the second part without penetrating completely through the second layer.

According to other aspects of the disclosure, the method further comprises forming the second part in a compression molding die by placing the filler material that includes a fiber reinforcement in the compression molding die and also separately depositing the resin matrix into the compression molding die. The method may further comprise depositing the resin matrix into the compression molding die in two steps. In one step, the resin is deposited in the compression molding die to encase the filler material in the first layer. In another step, the resin is deposited in the compression molding die in the second layer. In another approach, the method may further comprise providing a textured surface on a predetermined portion of the compression molding die where the second layer is formed. The textured surface inhibits the filler material from becoming part of the second layer. Following either approach, the second layer may be more than 3 microns thick.

According to another aspect of the disclosure, an assembly may be provided that includes a first part and a second part formed of a composite material that are joined together with a fastener. The second part has a first layer of a resin matrix that is reinforced with a filler and a second layer of a resin matrix that does not include the filler on at least part of one side of the second part. The fastener extends through the first part and partially through the second part. The fastener extends into the second layer without extending through the second layer.

According to other aspects of the disclosure as it relates to the assembly, the fastener may be a self-piercing rivet having a tubular portion that extends fully through the filler material. However, the filler material is not exposed on a side of the second part that is opposite the first part. The tubular portion may be spread apart within the second part to secure the first part to the second part. The filler may be a fiber reinforcement that is randomly deposited or aligned in the resin matrix. The second layer of the second part may be provided in localized areas on the first layer where the self-piercing rivets are intended to be driven into the assembly.

According to another aspect of the disclosure, a composite part is provided that includes a first layer that includes fiber reinforcement material and a second layer that is not reinforced to provide added ductility in a layer of the composite part. The second layer of the resin matrix that does not include the filler material is provided on at least part of one side of the second part and may be more than 3 microns thick. The filler material in the composite part may be a fiber reinforcement that is randomly deposited or aligned in the resin matrix. The second layer may define voids across areas of the first layer. The resin matrix may be a thermoplastic resin or a thermoset resin. The filler material may be carbon fiber, glass fiber, mica, natural fiber, or the like.

These and other aspects of the disclosure will be better understood in view of the attached drawings and the following detailed description of the disclosed embodiments.

BRIEF DESCRIPTION OF THE DRAWINGS

FIG. 2 is a diagrammatic view showing one rivet in position to be inserted into a metal part and a composite part;

FIG. 3 is a fragmentary cross-sectional view showing a self-piercing rivet inserted through a first panel and into a second composite material panel having added resin matrix; and FIG. 4 is a perspective view partially in cross section showing the obverse side of a pair of panels joined with self-piercing rivets in areas having additional resin matrix material.

DETAILED DESCRIPTION

Figure 1A:
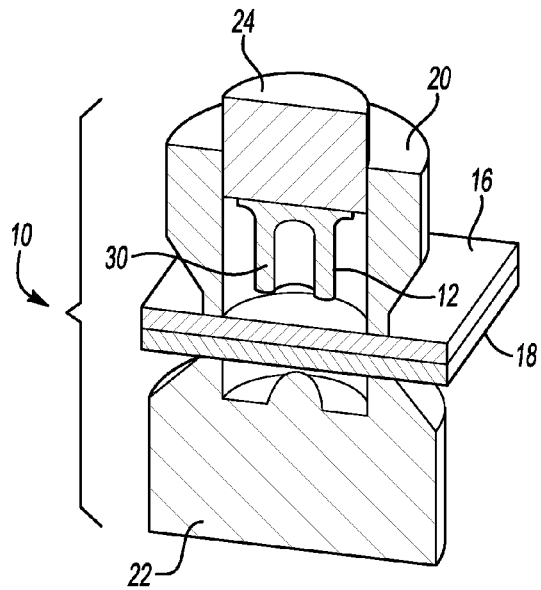
FIGS. 1A-1D are a series of diagrammatic views illustrating the manufacturing process for inserting a self-piercing rivet with a self-piercing rivet tool into two panels beginning with the initial set up through completion of the riveting process.

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Referring to FIGS. 1A-1D, a self-piercing rivet tool is generally identified by reference numeral 10. The self-piercing rivet tool 10 is used to insert a self-piercing rivet 12 (hereinafter "SPR") into a first panel or part 16 and a second panel or part 18. The first panel may be a steel, aluminum or other metal panel or may alternatively be a composite part, such as, an SMC composite panel including a fiber reinforced resin. The second panel or part 18 is a composite panel that is preferably provided with additional matrix material on the lower side of the panel 18. The structure of the second panel, or part, 18 is described more specifically with reference to FIGS. 2-4.

The first and second panels 16 and 18 are shown in FIG. 1A to be retained between a blank holder 20 and a die 22 that engage opposite sides of the stack of panels. Additional panels may be provided of various compositions. This disclosure is intended to include stacks of three, four or more panels of various thicknesses and compositions. The die 22 backs up the panels 16 and 18 as the punch 24 drives the rivet.

Figure 1B:
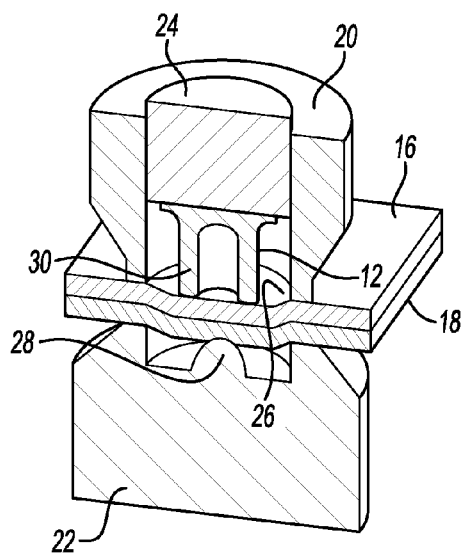

Referring to FIG. 1B, the first part of the riveting process is illustrated wherein an indentation 26 is formed in the panels 16 and 18 that are driven into a pip 28 formed in the die 22. While a pip 28 is shown in the illustrated embodiment, a die 22 having a flat surface could also be employed in the disclosed process. The rivet 12 includes a hollow tubular portion 30 that is driven into the first and second panels 16 and 18 to join the panels together.

Figure 1C:
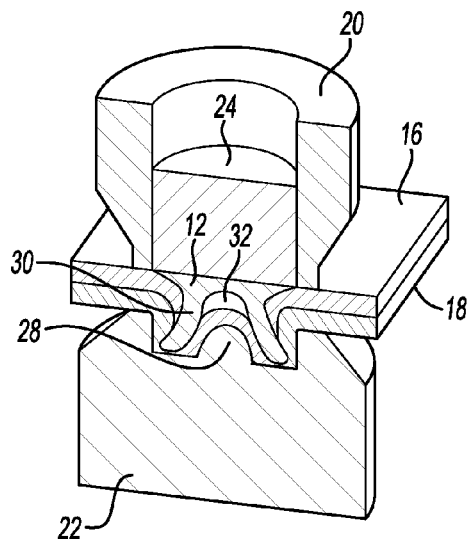

Referring to FIG. 1C, the rivet 12 is shown fully inserted into the first and second panels 16 and 18 with the punch 24 driving the rivet 12 until it is flush with the first panel 16. The blank holder 20 continues to apply pressure to the first panel 16 while the tubular portion 30 of the rivet 12 is driven through the first panel 16 and into the second or composite panel 18. A slug 32 is separated from the first panel 16 and retained within the hollow tubular portion 30 of the rivet 12 when the self-piercing rivet is inserted into the panels 16 and 18. The hollow tubular portion 30 is shown in an expanded condition after it is driven over the pip 28 that is covered by the second panel 18.

Figure 1D:
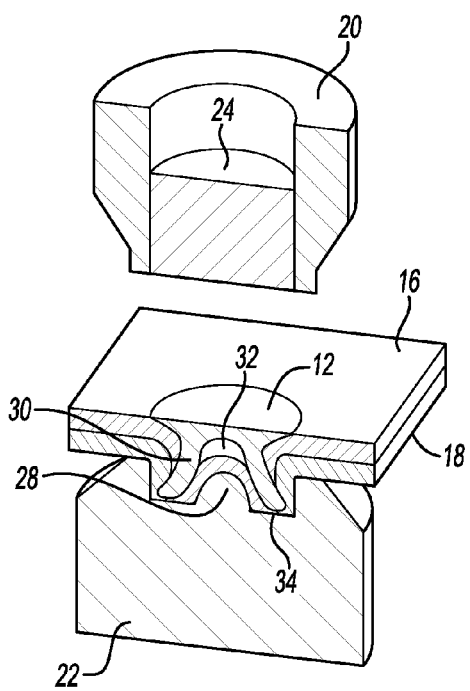

Referring to FIG. 1D, the blank holder 20 and punch 24 are shown being lifted off the first panel 16 after having inserted the rivet 12 through the first panel 16 and into the second panel 18. A button 34 is formed by the rivet 12. The button 34 is formed by the rivet 12 as it is inserted through the first panel 16 and partially through the second panel 18. The rivet 12 and joined panels 16 and 18 are shown in position to be removed from the die 22.

Referring to FIG. 2, a single rivet 12 is shown above two panels 16 and 18 that are ready to be joined by insertion of the rivet 12. A fiber filled layer 36 includes randomly distributed fibers and filler. The fiber filled layer 36 may include a carbon fiber, glass fiber, mica, or natural fiber filler material that may be arranged as a random composite or loose filler material. The fiber filled layer 36 is encased in a resin matrix. The resin matrix may be a thermoplastic or thermoset resin. A matrix layer 38 is provided adjacent the fiber filled layer 36 on the obverse side 40 of the second panel 18. The term "obverse side" as used herein is intended to identify the side of the stack of panels that is opposite the side through which the rivet 12 is inserted. The matrix layer 38 is preferably three microns or more in thickness to provide a flexible non-brittle layer into which the tubular portion 30 of the rivet 12 may extend. A top layer 44 may be provided above the fiber filled layer 36 that may be approximately 1 to 2 microns thick. As illustrated, the thickness of the layers 38 and 44 are exaggerated to be visible in the drawings. The top layer 44 is provided to assure a smooth surface on the panel, as required.

A textured surface 46 may be provided on the obverse side 40 of the second panel 18. The textured surface 46 may serve to prevent fiber filler material from moving too close to the obverse side 40 in the molding or panel forming process. The textured surface 46 permits additional resin accumulating to 3 microns or more to form a relatively pure matrix mix adjacent the obverse side 40. The textured surface 46 may be provided over the entire surface of the second panel 18 or may be provided in localized areas.

Referring to FIG. 3, a rivet 12 is shown inserted through a first panel 16 and into the second panel generally indicated by reference numeral 18. The second panel 18 is preferably a composite material, such as an SMC, injection molded, compression molded, or Vartum liquid vacuum assist manufactured panel. As the rivet 12 is inserted, a slug 32 is severed from the first panel 16. The slug 32 locks the tubular portion 30 of the rivet 12 into an expanded condition and interlocks with the fiber filled layer 36 of the second panel 18. The matrix layer 38 facilitates forming a smooth button 34 on the obverse side 40 of the second panel 18. Fibers in the fiber filled layer 36 may be displaced upon insertion of the tubular portion 30 of the rivet 12 but any displaced fibers are held within the panel by the matrix layer 38.

Referring to FIG. 4, a first panel 16 is shown below a second panel 18. The first and second panels are inverted in comparison to the other views presented above to illustrate the two areas having added matrix material in localized areas. An edge area 52 is shown in which additional resin is provided to permit joining the two panels together with rivets 12 (shown in FIGS. 1-3). The rivets 12 upon insertion form buttons 34 on the edge area 52. In a similar manner, a single rivet area 54 is shown that is partially or wholly circular and may be provided in a particular localized area to receive a single rivet 12 (shown in FIGS. 1-3). By providing only localized areas 52, 54 of added matrix, the weight of the second panel 18 may be minimized while providing a matrix layer 38 in which well-formed and smooth buttons 34 may be formed on the obverse side of the second panel 18.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:

selecting a first part;

selecting a second part including a first layer of a resin reinforced with a filler and a second layer of a resin without a filler on one side of the second part;

forming the second part as an integral piece in a compression molding die by: placing the filler, which includes a fiber reinforcement, in the compression molding die; and depositing the resin into the compression molding die;

inserting the first and second parts between a fastener in a tool and a die, and driving the fastener through the first part without penetrating completely through the second layer of the second part.

2. The method of claim 1 further comprising providing a textured surface on a predetermined portion of the compression molding die where the second layer is formed, wherein the textured surface inhibits the filler from becoming part of the second layer.

3. The method of claim 1 wherein the step of depositing the resin into the compression molding die is performed in two steps, in one step the resin is deposited in the compression molding die to encase the filler in the first layer and in another step the resin is deposited in the compression molding die in the second layer.

4. The method of claim 1 wherein the fastener is a self-piercing rivet, and the tool is a riveting tool.

5. The method of claim 1 wherein the second layer is more than 3 microns thick.

* * * * *